United States Patent
Sud et al.

[11] Patent Number: 5,919,266
[45] Date of Patent: Jul. 6, 1999

[54] APPARATUS AND METHOD FOR FAULT TOLERANT OPERATION OF A MULTIPROCESSOR DATA PROCESSING SYSTEM

[75] Inventors: Raman K. Sud, Fremont; Chris Koverman, Soquel; Jingsong Cai, Fremont; Thomas Hill, Cupertino, all of Calif.

[73] Assignee: Centigram Communications Corporation, San Jose, Calif.

[21] Appl. No.: 08/041,770

[22] Filed: Apr. 2, 1993

[51] Int. Cl.[6] .................................................. G06F 13/00
[52] U.S. Cl. ........................................................... 714/13
[58] Field of Search ................................... 395/575, 650, 395/652, 182.11; 371/11.1, 11.3; 364/942.4

[56] References Cited

U.S. PATENT DOCUMENTS

| | | | |
|---|---|---|---|
| 4,412,281 | 10/1983 | Works ........................................ | 364/200 |
| 4,562,575 | 12/1985 | Townsend .................................. | 371/9 |
| 4,608,631 | 8/1986 | Stiffler et al. ............................ | 364/200 |
| 4,817,091 | 3/1989 | Katzman et al. .......................... | 371/9 |
| 4,847,837 | 7/1989 | Morales et al. ........................... | 371/8 |
| 4,972,313 | 11/1990 | Getson, Jr. et al. ...................... | 364/200 |
| 5,003,464 | 3/1991 | Ely et al. .................................. | 364/200 |
| 5,113,398 | 5/1992 | Howes ...................................... | 371/11.2 |
| 5,214,652 | 5/1993 | Sutton ....................................... | 371/9.1 |

*Primary Examiner*—Robert W. Beausoliel, Jr.
*Assistant Examiner*—Norman Michael Wright
*Attorney, Agent, or Firm*—William S. Galliani; Pennie & Edmonds LLP

[57] ABSTRACT

A fault tolerant multiple processor data processing system is described. The system includes a number of processors linked together in a network. One processor is designated the master processor and coordinates the operation of all of the processors. The network is coupled to a number of memory devices which store information which is utilized by the processors. The apparatus includes a redundant mechanism for identifying a failure of a processor. If the master processor fails, a new master processor is selected, in a dynamic manner, from the remaining operative processors. The selection of a new master processor is based upon a contention operation in which the operative processors contend to become the new master processor.

22 Claims, 4 Drawing Sheets

| Last Update | P_1 | P_2 | P_3 | P_4 | P_5 | ....... | P_N |
|---|---|---|---|---|---|---|---|
| T_1 | 1 | 1 | 1 | 1 | 1 | ... | 1 |
| T_2 | 1 | 1 | 1 | 1 | 0 | ... | 1 |
| T_3 | 1 | 1 | 1 | 1 | 1 | ... | 1 |
| . | . | . | . | . | . | | . |
| . | . | . | . | . | . | | . |
| T_N | 1 | 1 | 0 | 1 | 1 | ... | 1 |

Figure 3

| Task | Primary Proc. | Secondary Proc. | Mode |
|---|---|---|---|
| T_A | P_2 | P_3 | Hot |
| T_B | P_1 | P_4 | Cold |
| T_C | P_3 | Any | Cold |
| . | . | . | . |
| . | . | . | . |
| T_N | P_N | P_3 | Warm |

Figure 4

APPARATUS AND METHOD FOR FAULT TOLERANT OPERATION OF A MULTIPROCESSOR DATA PROCESSING SYSTEM

BRIEF DESCRIPTION OF THE INVENTION

This invention relates generally to data processing systems which incorporate a number of microprocessors to execute a large number of tasks. This invention more particularly relates to a fault tolerant data processing system which, in the presence of one or more failed microprocessors, dynamically redistributes tasks from the failed microprocessors to the microprocessors which are still operating.

BACKGROUND OF THE INVENTION

An ongoing trend in data processing systems is to replace a single mainframe-class processor with an array of linked microprocessors. The linked microprocessor architecture introduces a number of problems. One prevalent problem is to maintain system operation despite the failure of an individual microprocessor. This problem is especially acute if the failed microprocessor is the "master" microprocessor which coordinates the activities of the other microprocessors.

The traditional approach to resource reallocation after the failure of a microprocessor is to rely upon a static list which defines the new control scheme. For example, the static list might define that in the event that a first microprocessor goes down, then a forth microprocessor is to assume its tasks.

The problem with the static list approach relied upon in the prior art is that it is slow. The static list methodology requires that all of the system resources be established prior to making reallocation decisions. In other words, all of the system components must be polled or tested to determine which components are operative. Only after it is known which components are operative can the static list be invoked to establish a redistribution of resources. It would be highly desirable to reduce the amount of time required to make resource reallocation decisions after the failure of a microprocessor in a multiple microprocessor architecture.

Another problem with the static list reallocation approach is that it is resource intensive. That is, a resource redistribution scheme must be defined for each permutation of resource availability.

Another problem associated with prior art resource reallocation schemes is that they may result in the designation of more than one master microprocessor. This situation will "crash" the system, as the separate microprocessors produce conflicting system instructions.

OBJECTS AND SUMMARY OF THE INVENTION

Thus, it is a general object of the present invention to provide an improved fault tolerant multiprocessor data processing system.

It is a more particular object of the invention to provide a fault tolerant multiprocessor data processing system with an enhanced resource redistribution response time.

It is another object of the invention to provide a fault tolerant multiprocessor data processing system with reduced resource overhead requirements.

It is still another object of the present invention to provide a fault tolerant multiprocessor data processing system which does not rely upon a static list for resource redistribution.

It is another object of the invention to provide a fault tolerant multiprocessor data processing system which will prevent the designation of two master processors.

These and other objects are achieved by a fault tolerant multiple processor data processing system in accordance with the invention. The system includes a number of processors linked together in a network. One processor is designated the master processor and coordinates the operation of all of the processors. The network is coupled to a number of memory devices which store information which is utilized by the processors. The apparatus includes a redundant mechanism for identifying a failure of a processor. If the master processor fails, a new master processor is selected, in a dynamic manner, from the remaining operative processors. The selection of a new master processor is based upon a contention operation in which the operative processors contend to become the new master processor.

BRIEF DESCRIPTION OF THE DRAWINGS

For a better understanding of the nature and objects of the invention, reference should be made to the following detailed description taken in conjunction with the accompanying drawings, in which:

FIG. 3 depicts a set of "write" information which may be distributed at predetermined memory locations, the write information is used to detect failures within the apparatus of the invention.

FIG. 4 depicts a task resource table which describes tasks to be performed by the apparatus of the invention, a primary processor to perform the task, a secondary processor to perform the task, and a standby state for the secondary processor.

Like reference numerals refer to corresponding parts throughout the several views of the drawings.

DETAILED DESCRIPTION OF THE INVENTION

Figure 1:
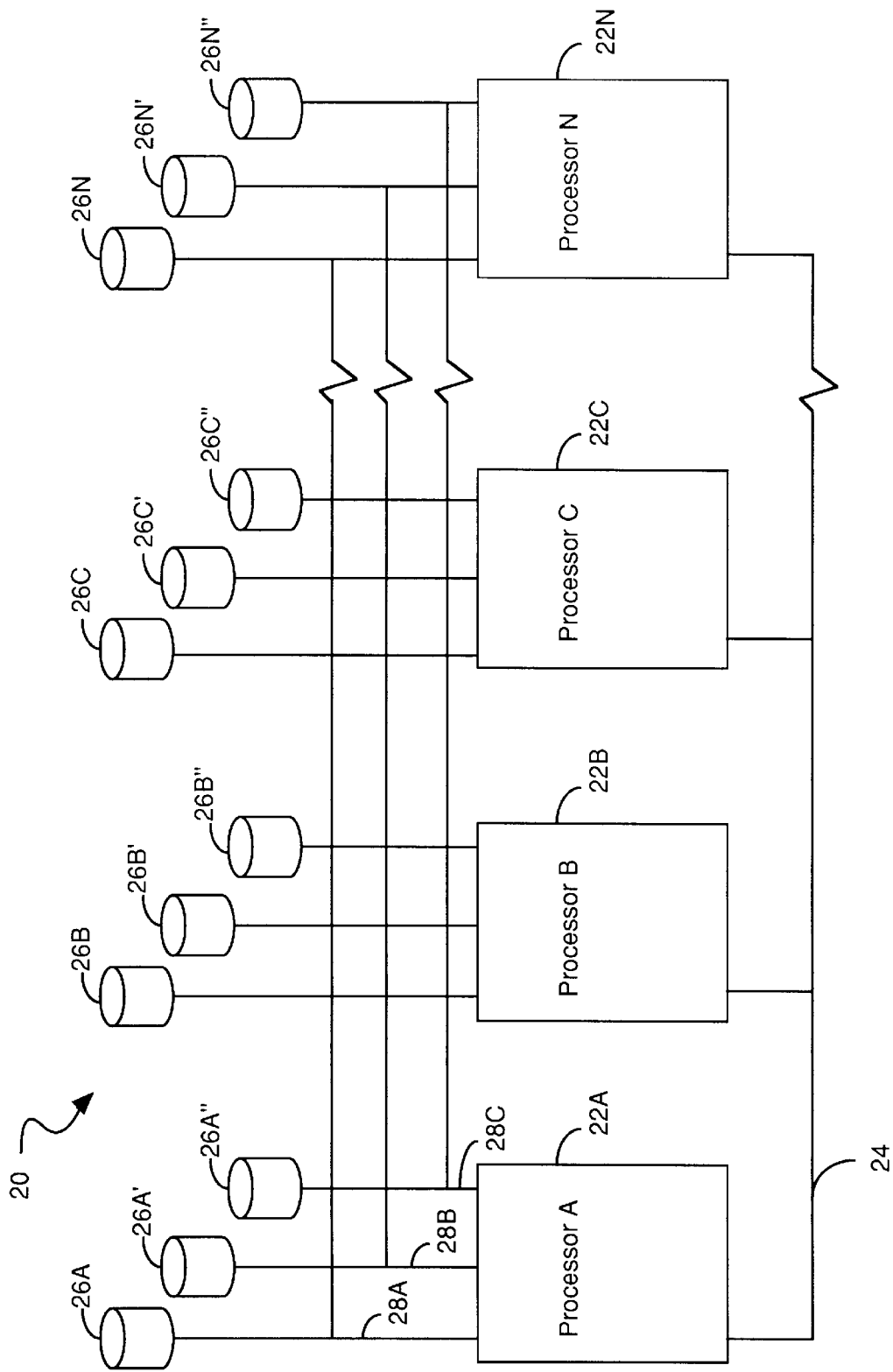
FIG. 1 is a diagram of a fault tolerant multiprocessor data processing system in accordance with the present invention.

Referring to FIG. 1, a fault tolerant multiprocessor data processing system 20 is depicted. The system 20 includes a plurality of microprocessors 22 (also referred to herein as "processors"). The microprocessors 22 are configured as a Local Area Network (LAN) through LAN cable 24. In addition to being coupled to one another, the microprocessors 22 are coupled to a plurality of memory devices 26, such as hard disk drives. The microprocessors 22 may be coupled to the memory devices 26 through Small Computer System Interface (SCSI) connectors 28. The configuration of FIG. 1 allows each microprocessor 22 to communicate with every other microprocessor 22. In addition, each microprocessor 22 is configured to access each memory device 26. This general hardware configuration is known in the art. Attention presently turns to the fault tolerant operation of the system in accordance with the invention.

Figure 2:
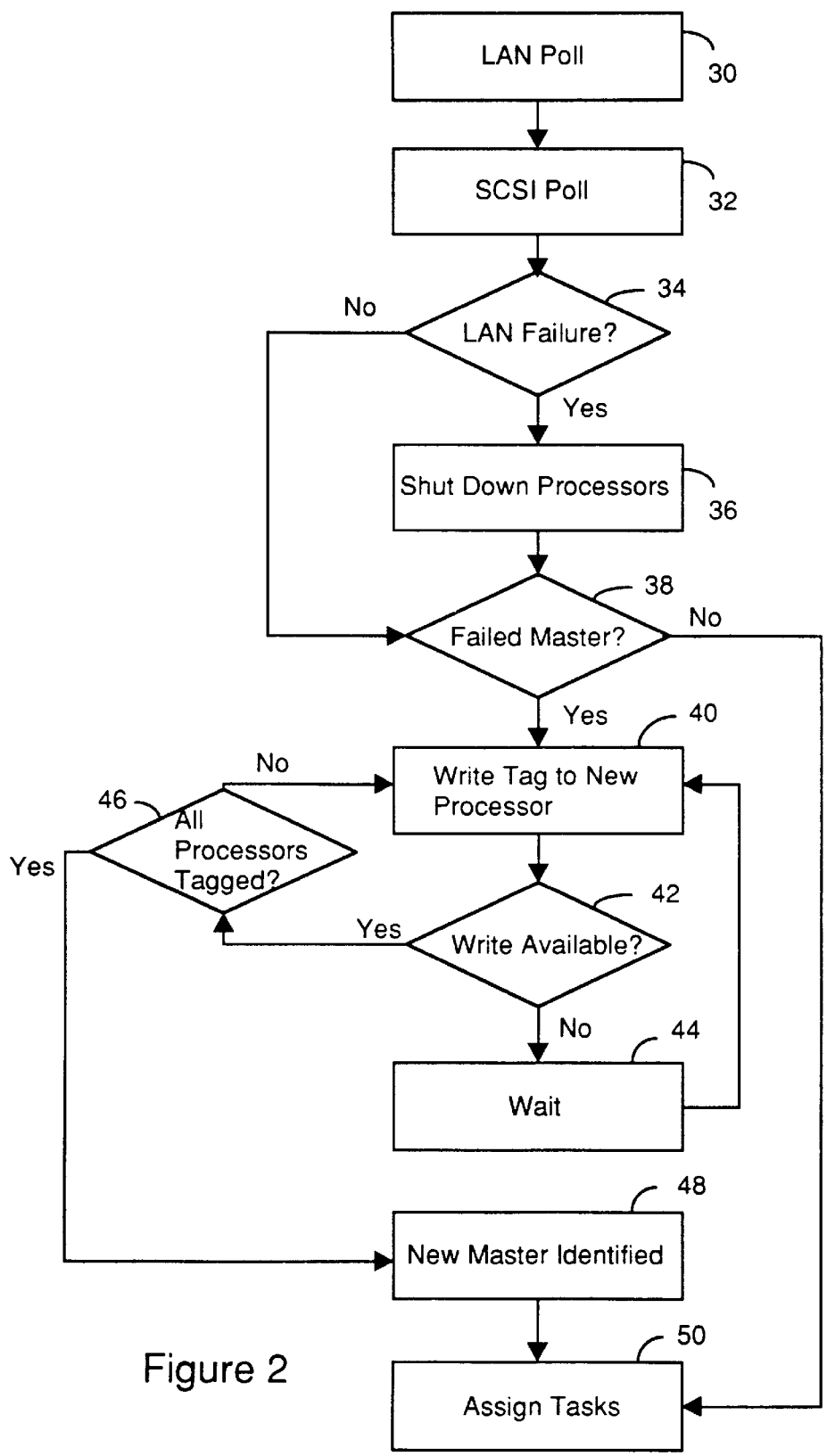
FIG. 2 is a control sequence executed in conjunction with the apparatus of FIG. 1.

FIG. 2 depicts a control methodology to be executed in accordance with the apparatus of FIG. 1. The first step associated with the control sequence of the invention is to poll the Local Area Network 24 (block 30). This step involves each microprocessor 22 periodically broadcasting a signal over the LAN to indicate that it is operating. The signal is received by the remaining microprocessors 22 on the LAN. Each microprocessor 22 on the LAN expects to receive a broadcasted signal from every other microprocessor 22 within a predetermined time frame. Failure to receive such a broadcasted signal from a particular microprocessor, say microprocessor 22A, indicates that the particular microprocessor 22A may be inoperative. In the alternative, the failure to receive a broadcasted signal from a particular microprocessor may indicate that there is a failure on the LAN connection 24. The specific nature of the problem is identified with the SCSI poll step (block 32).

The SCSI poll step (block 32) associated with the invention entails each microprocessor 22 periodically performing a write operation at a predetermined write location on a memory device 26. A sequence of information is written at the designated write location. The sequence of information preferably includes a time at which the write operation takes place and "view" information. The view information preferably describes the system resources as observed by the particular microprocessor 22 performing the poll operation. For instance, each microprocessor may be assigned a bit location in the information written to the designated location. A ONE at that bit location may indicate that the corresponding microprocessor is operative, while a ZERO at that bit location may indicate that the corresponding microprocessor is inoperative. This scheme is illustrated in FIG. 3. Each row 60 provides the "write" information recorded at each designated disc location. Thus, row 60A indicates that a first designated disc location receives a time (T__1) and a number of ONE bits indicating that each processor (P__1, P__2, . . . ,P__N) is operative. Row 60B indicates that a second designated disc location receives a time (T__2) and a number of bits which indicate that all processors are operative, except for processor P__5. This scheme is repeated for each designated write location.

As previously stated, each microprocessor 22 is capable of accessing each memory device 26. Thus, in the SCSI polling process, each microprocessor checks the designated write locations of the other microprocessors within the system. If the data at a given write location does not change for a predetermined period of time, there is some type of microprocessor failure. For instance, returning to FIG. 3, if the time T__2 at row 60B does not change for a predetermined period, it can be determined that there is some type of microprocessor failure since the location has not been updated with new information.

The microprocessor failure information obtained from the SCSI poll step (block 32) can be coordinated with the information obtained during the LAN polling step (block 30). For example, if the LAN polling step indicates that microprocessor 22A may be down, and the SCSI polling step indicates that the data contents at the write location corresponding to microprocessor 22A have not changed, then a conclusion can be made that microprocessor 22A has failed. On the other hand, if the LAN polling step indicates that microprocessor 22A may be down, but the SCSI polling step indicates that the data contents at the write location corresponding to microprocessor 22A have changed, then a conclusion can be made that microprocessor 22A has not failed, but the LAN connection to the microprocessor has failed.

Thus, the invention includes a redundant informational mechanism to identify a microprocessor failure. Namely, a LAN polling step (block 30) and a SCSI polling step (block 32) are used to identify whether each microprocessor is operative. The invention also includes a redundant mechanism to identify a LAN failure. Namely, a LAN polling step (block 30) and a SCSI polling step (block 32) are used to respectively identify the absence of a broadcasted message from processors severed from the LAN, and the presence of updated "write" information at the predetermined "write" locations for processors severed from the LAN.

When a LAN failure is identified (block 34), the effected processor is shut down (block 36). If several microprocessors are effected by the LAN failure, then a number of guidelines may be used to determine which microprocessors to shut down. One such guideline is that a minority cluster of microprocessors should be shut down when they are severed from the LAN. In the case of a LAN failure, each microprocessor in the minority cluster recognizes that it is not receiving broadcast messages over the LAN from the other microprocessors. It also recognizes that the other microprocessors are still writing to their designated write locations. Therefore, it combines this information with information regarding its physical location in the network to identify itself as a minority cluster which should be shut down. For example, in reference to FIG. 1, a break in the LAN may occur between microprocessors 22B and 22C. Microprocessors 22A and 22B would recognize that they represent a minority cluster compared to microprocessors 22C through 22N. Accordingly, they would shut themselves down.

If the there is a break in the middle of the LAN, eliminating the applicability of the minority cluster rule, the cluster without the master microprocessor should shut itself down.

After a LAN failure or a microprocessor failure is identified, a decision is made to determine whether the master microprocessor is still operating (block 38). If the master microprocessor has not failed, then it is in a position to assign tasks (block 50) to the operating microprocessors to accommodate the failed microprocessor. If the master microprocessor has failed, then a new master microprocessor must be designated.

The present invention provides a dynamic mechanism to identify a new master microprocessor. The prior art relies upon a static list to make such a decision. The static list cannot be referenced until all system resources have been polled. Therefore, the approach is relatively slow. The static list approach also has a relatively high overhead as definitions for all system operation parameters must be established.

The apparatus and method of the invention identifies a new master microprocessor in a dynamic fashion. This approach operates in the following manner. In short, a contention operation is utilized. That is, each microprocessor contends to become the new master microprocessor. This procedure is executed in the following manner.

Each microprocessor supports a function wherein it accepts a single tag at a designated memory location. If the designated location already has a tag, then attempts to overwrite the tag with a new tag fail. If a new master microprocessor is not declared within a given period following the writing of a tag, the microprocessor allows a new tag to be written at the designated location. This operation is more fully described in relation to FIG. 2.

The contention operation begins with a microprocessor 22 attempting to write its tag to a selected processor 22 (block 40). Initially, each microprocessor 22 attempts to write its tag on itself. A decision is then made to determine whether the write operation is available (block 42). If the write operation is not available because another tag is already written to the designated location, then the microprocessor 22 waits (block 44) prior to attempting another tag writing operation. Preferably, each microprocessor 22 is assigned a different delay period.

On the other hand, if a write is available, then the processor 22 which performs the write operation determines whether it has tagged each of the processors (block 46). If the processor has not tagged each of the processors, it attempts to do so by writing a tag to a new processor (block 40). This procedure is repeated until a single microprocessor, say microprocessor 22A, has tagged each of the remaining microprocessors (microprocessors 22B through 22N). This decision is made at decision block 46. Once a processor has tagged each of the operating processors, it declares itself the new master (block 48). This may be accomplished by writing a master identification tag on each processor.

The described contention process assures that only a single new master processor will be declared. Prior art systems potentially elect two or more new master processors. The designation of multiple processors, as observed in the prior art, will eventually cause the system to crash.

The described contention process is also beneficial in that a new master processor may be identified prior to all processors even recognizing that a processor has failed. In the prior art, all processors must recognize the failed processor and wait for additional polling of resources prior to invoking the static list which will determine the new master processor.

Preferably, the contention process is timed. If a new master is not identified within a predetermined period, then the system should be reset.

After a new processor is identified (block 48), new tasks are assigned (block 50). That is, the new master processor determines which processors will assume the operations of the failed processor.

Task assignment is a straight-forward operation when the failed microprocessor is not the master microprocessor. In this case, the master microprocessor is already aware of the operations being performed by the failed microprocessor. Therefore, it can redistribute those operations among the remaining microprocessors.

Task assignment when the failed microprocessor is the master microprocessor can be achieved in a number of ways. Initially, the new master microprocessor obtains a list of system resources from a memory device 26. The system resources are typically placed in a configuration file which is stored on a memory device 26.

Once this system information is obtained, the new master polls the other operating microprocessors to determine what tasks they are performing. The new master must then compare these resources with the master resource list. Based upon this comparison, the new master microprocessor allocates missing operations to the various operating microprocessors.

The amount of information a new master microprocessor receives depends upon the task standby status. In the case of a "cold standby", the new master microprocessor does not receive any previous system resource operational status information.

In a "warm standby" scenario, the new master microprocessor receives the system resource list from a memory device and partial system resource operational status information from another microprocessor. In this mode, a second microprocessor maintains partial system resource operational status information in the form of selected initialization information. This information is passed to the newly designated microprocessor so that it can rapidly assume the selected tasks which are already initialized.

In a "hot standby" mode, the new master microprocessor receives the system resource list from a memory device and complete system resource operational status information from another microprocessor. In this case, a second microprocessor shadows the operation of the master microprocessor. That is, the second microprocessor maintains complete system initialization information. In addition, the master microprocessor continuously passes all operational information to the "hot standby" microprocessor. Thus, the "hot standby" microprocessor will receive all of the master microprocessor data up to the time the master microprocessor fails. This system may be used in critical operational environments which require instantaneous recovery after the failure of a master microprocessor. "Hot standby" may also be used for operations which involve significant initialization time.

Some critical tasks performed by a system may require "hot standby" status. Accordingly, such tasks will be performed by the master microprocessor and another microprocessor will be designated to receive the shadow information. On the other hand, non-critical tasks may be allocated "cold standby" status, which means that relevant information concerning the task is stored on one of the memory devices 26.

FIG. 4 depicts a resource allocation table which may be used in conjunction with the invention. Each row 62 defines a task to be performed, a primary processor to perform the task, a secondary processor to perform the task, and a description of the stand-by status. For instance, in row 62B, task T_B is performed by processor P_1, processor P_4 is designated as the secondary processor, which is in a "cold" standby state. In row 62C, task T_C is executed on primary processor P_3. In the case of the failure of processor P_3, any processor may be accessed for the system resource operational status information.

Figure 5:
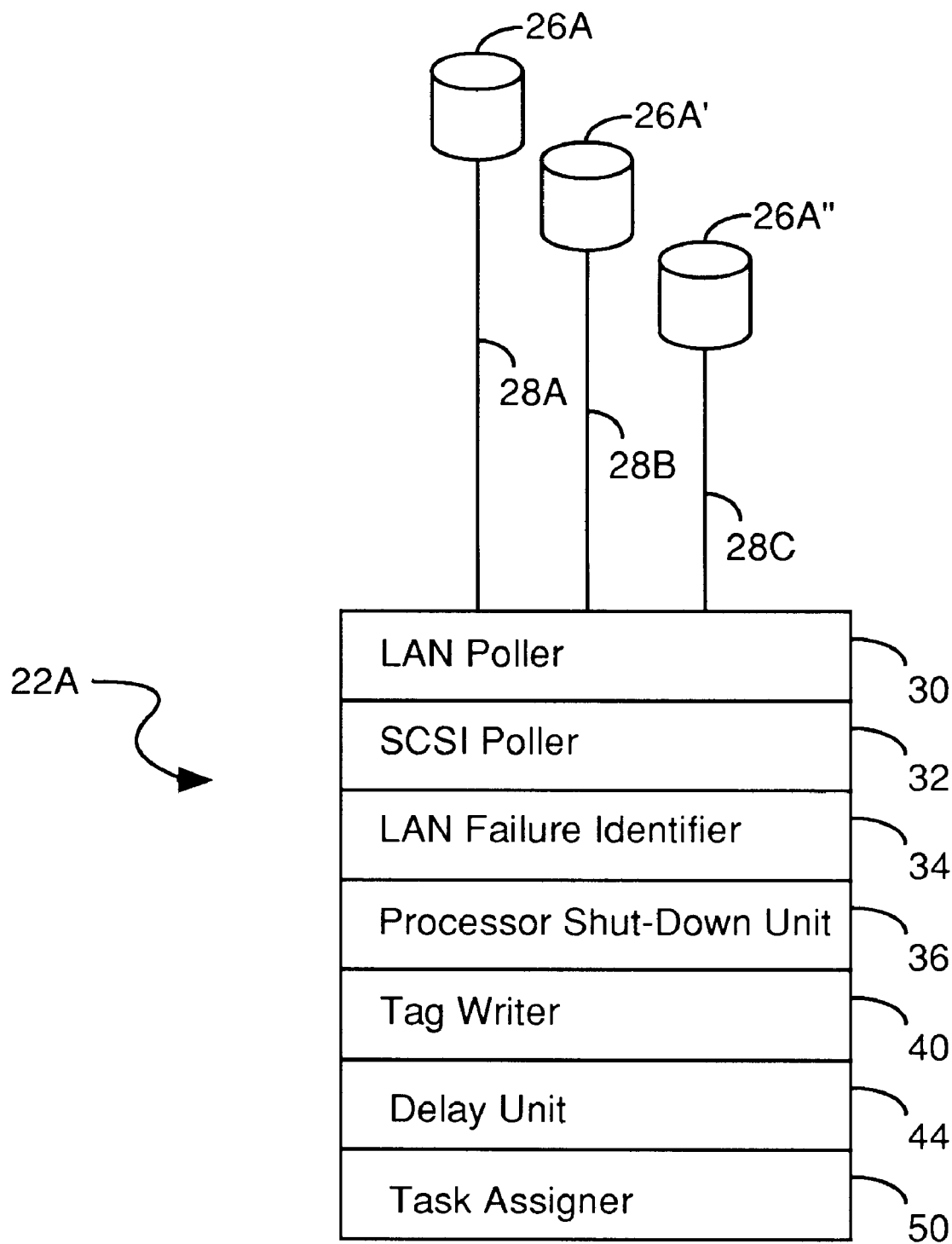
FIG. 5 depicts a microprocessor incorporating the control methodology of the invention.

FIG. 5 depicts a single microprocessor 22A from the multiprocessor environment of FIG. 1. As indicated in the figure, the microprocessor 22A includes a number of coded modules for executing the tasks described in relation to FIG. 2. Specifically, the microprocessor 22A includes a LAN poller 30, a SCSI poller 32, a LAN failure identifier 34, a processor shut down unit 36, a tag writer 40, a delay unit 44, and a task assigner 50 corresponding to the operations described in FIG. 2. Note that some of the decision steps of FIG. 2, such as "write available" (block 42), are operations indigenously supported by each microprocessor 22.

Failures of the memory devices 26 are preferably dealt with by "disc mirroring", a technique known in the art. Disc mirroring entails backing up information from one memory device on another memory device. The disc mirroring operation in the present invention is very efficient since multiple SCSI connections 28 are provided. That is, since each memory device is accessible from a number of SCSI connections 28, shadowing operations are readily continued even in the event of the failure of a SCSI connection, say 28B.

The described invention has been implemented in an audio information processing system executing the QNX Operating System, which is produced by Quantum Software Systems Ltd., Ottawa, Ontario, Canada. One skilled in the art will appreciate that the apparatus and method of the invention may be used in analogous multiprocessor environments, such as a LAN server, a video server, or a critical database server.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A fault tolerant multiple processor data processing system, comprising:
    a plurality of processors including a master processor which coordinates the operation of said plurality of processors;
    means for connecting said plurality of processors to form a local area network;
    a plurality of memory devices coupled to said plurality of processors;
    means for identifying a failure of said master processor; and
    means for assigning a new master processor from said plurality of processors, in a dynamic manner, after said failure of said master processor, said assigning means including means for executing a contention operation wherein each processor of said plurality of processors contends to become said new master processor by attempting to write a tag on each processor of said plurality of processors.

2. The fault tolerant multiple processor data processing system of claim 1 wherein said contention operation of said executing means includes each of said plurality of processors generating a rejection of a tag when a tag is already written thereon.

3. The fault tolerant multiple processor data processing system of claim 2 wherein said contention operation of said executing means includes each of said plurality of processors establishing a predetermined delay period in response to said rejection.

4. The fault tolerant multiple processor data processing system of claim 1 wherein said new master processor includes means for redefining tasks to be performed by said plurality of processors.

5. The fault tolerant multiple processor data processing system of claim 4 wherein said redefining means includes means for comparing polled system resource information with a system resource list to determine said tasks to be performed by said plurality of processors.

6. The fault tolerant multiple processor data processing system of claim 5 wherein said system resource list is obtained from said plurality of memory devices.

7. The fault tolerant multiple processor data processing system of claim 5 wherein said new master processor receives partial system resource operational status information from one of said plurality of processors.

8. The fault tolerant multiple processor data processing system of claim 5 wherein said new master processor receives complete system resource operational status information from one of said plurality of processors.

9. The fault tolerant multiple processor data processing system of claim 1 wherein said identifying means includes means for utilizing said local area network to identify the viability of said master processor; and
    means for employing said plurality of memory devices to identify the viability of said master processor.

10. The fault tolerant multiple processor data processing system of claim 1 wherein said identifying means includes means for utilizing said network and said plurality of memory devices to identify a failure of said network.

11. The fault tolerant multiple processor data processing system of claim 10 wherein said failure of said network divides said network into a majority cluster of said microprocessors and a minority cluster of said microprocessors, said minority cluster of said microprocessors being shut down in response to said failure of said network.

12. A method of operating a multiple processor data processing system including a plurality of processors formed in a local area network with a master processor coordinating the operation of said plurality of processors, and a plurality of memory devices coupled to said plurality of processors, said method comprising the steps of:
    identifying a failure of said master processor; and
    assigning a new master processor from said plurality of processors, in a dynamic manner, after said failure of said master processor, said assigning step including the step of executing a contention operation wherein each processor of said plurality of processors contends to become said new master processor by attempting to write a tag on each processor of said plurality of processors.

13. The method of claim 12 wherein said contention operation of said executing step includes the step of each of said plurality of processors generating a rejection of a tag when a tag is already written thereon.

14. The method of claim 13 wherein said contention operation of said executing step includes the step of each of said plurality of processors establishing a predetermined delay period in response to said rejection.

15. The method of claim 12 further comprising the step of redefining the tasks to be performed by said plurality of processors, said redefining step being performed by said new master processor.

16. The method of claim 15 wherein said redefining step includes the step of comparing polled system resource information with a system resource list to determine said tasks to be performed by said plurality of processors.

17. The method of claim 16 wherein said system resource list is obtained from said plurality of memory devices.

18. The method of claim 16 wherein said new master processor receives partial system resource operational status information from one of said plurality of processors.

19. The method of claim 16 wherein said new master processor receives complete system resource operational status information from one of said plurality of processors.

20. The method of claim 12 wherein said identifying step includes the steps of:
    utilizing said local area network to identify the viability of said master processor; and
    employing said plurality of memory devices to identify the viability of said master processor.

21. The method of claim 12 further comprising the step of utilizing said network and said plurality of memory devices to identify a failure of said network.

22. The method of claim 21 wherein said failure of said network divides said network into a majority cluster of said microprocessors and a minority cluster of said microprocessors, said minority cluster of said microprocessors being shut down in response to said failure of said network.

* * * * *